United States Patent

Isenmann

(10) Patent No.: US 9,504,075 B2
(45) Date of Patent: Nov. 22, 2016

(54) FIELD DEVICE APPARATUS AND METHOD FOR COMMUNICATING OF A FIELD DEVICE APPARATUS WITH AN EVALUATION DEVICE

(71) Applicant: VEGA Grieshaber KG, Wolfach (DE)

(72) Inventor: Andreas Isenmann, Haslach i.K. (DE)

(73) Assignee: VEGA GRIESHABER KG, Wolfach (DE)

( * ) Notice: Subject to any disclaimer, the term of this patent is extended or adjusted under 35 U.S.C. 154(b) by 120 days.

(21) Appl. No.: 14/553,320

(22) Filed: Nov. 25, 2014

(65) Prior Publication Data

US 2015/0156805 A1 Jun. 4, 2015

(30) Foreign Application Priority Data

Dec. 4, 2013 (EP) .................................. 13195692

(51) Int. Cl.
| | | |
|---|---|---|
| *H04W 4/00* | (2009.01) | |
| *H04W 76/02* | (2009.01) | |
| *G08C 17/02* | (2006.01) | |
| *G05B 19/042* | (2006.01) | |
| *H04W 88/06* | (2009.01) | |

(52) U.S. Cl.
CPC ........ *H04W 76/023* (2013.01); *G05B 19/0423* (2013.01); *G08C 17/02* (2013.01); *G05B 2219/21099* (2013.01); *G05B 2219/25234* (2013.01); *G05B 2219/25428* (2013.01); *G05B 2219/31131* (2013.01); *H04W 88/06* (2013.01); *Y02P 90/18* (2015.11)

(58) Field of Classification Search
CPC .............. H04W 76/023; H04W 88/06; G05B 19/0423; G05B 2219/31131; G05B 2219/21099; G05B 2219/25234; G05B 2219/25428; G08C 17/02; Y02P 90/18
USPC ....................................... 455/426.1; 370/338
See application file for complete search history.

(56) References Cited

U.S. PATENT DOCUMENTS

| | | | |
|---|---|---|---|
| 6,906,638 B2 | 6/2005 | Gaiser | |
| 2010/0245931 A1 | 9/2010 | Sato | |
| 2012/0127523 A1 | 5/2012 | Terashita | |
| 2012/0208576 A1* | 8/2012 | Kamiya | ............... A61B 6/4283 455/500 |

FOREIGN PATENT DOCUMENTS

| | | |
|---|---|---|
| EP | 1 207 373 | 5/2002 |
| EP | 2 489 308 | 8/2012 |
| JP | 2010 278553 | 12/2010 |

* cited by examiner

*Primary Examiner* — Marcos Batista
(74) *Attorney, Agent, or Firm* — Fay Kaplun & Marcin, LLP (57) ABSTRACT

A field device apparatus is described which, for communicating with an evaluation device, can be operated in a direct or indirect operating mode, which both use the same access data.

9 Claims, 2 Drawing Sheets

FIELD DEVICE APPARATUS AND METHOD FOR COMMUNICATING OF A FIELD DEVICE APPARATUS WITH AN EVALUATION DEVICE

REFERENCE TO RELATED APPLICATIONS

This application claims the benefit of the filing date of European Patent Application Serial No. 13 195 692.2 filed on 4 Dec. 2013, the disclosure of which is hereby incorporated herein by reference.

TECHNICAL FIELD OF THE INVENTION

The invention relates to the field of measurement technology. In particular, the present invention relates to a field device apparatus and to a method for allowing a field device apparatus to communicate with an evaluation device.

BACKGROUND OF THE INVENTION

A field device or a field device apparatus is used when performing a measuring task to determine a physical measurement variable or measurement value. The physical measurement variable can be for example a running time or a transit time, a distance, pressure, a flow rate, a flow or a temperature. From the measured physical measurement variable it is possible to derive a measurement variable that is of interest. The measurement variable of interest may be for example a fill level in a container which is determined from a physical signal running time. A radar signal can be used to determine the signal running time.

The field device often needs to be used for taking physical measurements in a location which is remote from the site of an associated display device, remote from the site of an evaluation device and/or remote from the site of an operating device. An evaluation device and/or operating device is/are namely often located in a central control room or a central control centre. The evaluation device therefore often needs to be supplied with the measurement values generated by the field device over a long distance. Direct wire connections can be used to bridge these long distances. However, instead of the direct wire connections, communications networks can also be used which are arranged between an evaluation device and the field device. The connection to a communications network can be wired or wireless according to the application. The communications network can itself also use any combination of wireless or wired transmission technologies in order to connect at least two remote locations. Both a private and public communications network can be used as the transmission medium.

To access a communications network a wireless transmission technology can be used such as GSM (global system for mobile communications), UMTS (universal mobile telecommunications system), GPRS (general packet radio service) or LTE (long term evolution), mostly according to the chosen communications network. Unlike GSM, UMTS, GPRS or LTE, which are characterised in particular by having a long radio range, wireless access technologies can also be used that are locally more restricted, such as for example WLAN (wireless local area network), often based on a standard of the IEEE-802.11 protocol family, WiFi™, ZigBee or Bluetooth®. An example of wired access technology is the use of a modem connection or a DSL link (digital subscriber line).

However, if a field device or a field device apparatus is prepared for communication via a communications network, said field device is also reliant on the fact that the communications network is substantially always available. If the communications network should fail, it will no longer be possible to transmit data and in particular measurement values.

A mobile end device or mobile user equipment (UE), for example a smartphone, can comprise a tether mode in which a connection is made between a smartphone and a PC (personal computer) to enable an internet connection for the PC via GSM/UMTS. The mobile end device thus takes on the function of a modem.

SUMMARY OF THE INVENTION

There may be a need to connect a field device apparatus to an evaluation device and/or operating device in a flexible manner.

A field device apparatus and a method for communicating of a field device apparatus with an evaluation device are described. In other words, a field device apparatus and a method for allowing a field device apparatus to communicate with an evaluation device are described. The subject matter of the present invention is determined by the features of the independent claims. Embodiments of the invention are described in the dependent claims.

According to one aspect of the present invention a field device apparatus is described which comprises a measuring device and a communications device. The measuring device is configured to determine a measurement value and to communicate with the communications device. The measurement value determination and the communication may be executed independently of one another. The communications device is adapted to set an operation mode or to enter into an operating mode in order to connect to an evaluation device and/or in order to connect to an operating device. The operating mode can be selected from a first operating mode and a second operating mode. On selecting the operating mode in one example the selected operating mode may be activated and at the same time the other operating mode may be deactivated. The first operating mode enables an indirect connection of the communications device to the evaluation device and/or to the operating device in that a communications network is used. The second operating mode enables a direct connection of the communications device to the evaluation device and/or to the operating device. The indirect and direct connection involve the use of the same transmission technology. In particular, it may be possible to use the same transmitting device or the same communications device in the field device apparatus. In one example the transmission technology can comprise a communications protocol or a communications standard.

According to another aspect of the present invention a method for communicating of a field device apparatus with an evaluation device is described. In other words, according to an aspect of the present invention a method is described for allowing a field device apparatus to communicate with an evaluation device. The method comprises determining a measurement value by means of a measuring device. The measurement value may be determined independently of the other functions within the field device apparatus, for example independently of a communications function. The method may also comprise communicating of the measuring device with a communications device. Thus for example the measuring device can forward a determined measurement value to the communications device and/or the communications device can forward a parameter to the measuring device in order to set said parameter, i.e. in order to parameterise the measuring device. For the connection to an evaluation device the method may involve setting an operating mode which can be selected from a first operating mode and a second operating mode. When the first operating mode is set an indirect connection to the evaluation device is made possible via a communications network, and when the second operating mode is set a direct connection is made possible. The indirect and direct connection involve the use of the same transmission technology, in particular the use of the same transmission protocol and/or the same protocol stack. In one example the first operating mode can be distinguished from the second operating mode in that the communications device can actively establish a connection to a communications network in the first operating mode, whereas in the second operating mode it waits for a request to establish a connection from the evaluation device. A connection can be made actively if a request to establish a connection is sent to the communications network. Said request can then be responded to with a request for access data.

According to a further aspect of the present invention a computer-readable storage medium is described, on which a program code is saved, which when executed by a processor executes the method according to the invention.

According to a further aspect of the present invention a program product is described that comprises commands which when executed by a processor execute the method according to the invention.

A computer-readable storage medium can be a floppy disk, a hard disk, a USB (universal serial bus) storage medium, a RAM (random-access memory), a ROM (read-only memory) or an EEPROM (electrically erasable programmable read-only memory). A communications network such as the internet can also be considered as a computer-readable storage medium, which can enable the uploading or downloading of program code.

The communications device can selectively be connected indirectly to an evaluation device and/or an operating device via a communications network or can be connected directly substantially without connecting a network therebetween. Thus the field device apparatus may provide the option to establish a connection to the evaluation device via a communications network as well as there can be a direct connection of the evaluation device to the field device apparatus.

In other words the communications device can be adapted to selectively establish a connection to a communications network or to accept a request for connection from another device. In one example the communications device may also be adapted to establish a connection to a communications network and at the same time accept a request for connection from another device, in order to establish a connection to the other device, for example via at least two different interfaces or ports, each with different or the same access data. The connection that the communications device establishes to another network may be referred to as an "intrinsic connection" or "own connection" of the field device apparatus. To establish connections in different modes of operation at the same time, a plurality of communications devices can be provided, or a plurality of interfaces can be provided on a single communications device which enables parallel operation in different modes of operation, wherein the plurality of communications devices and/or the plurality of interfaces use either the same or different access data and can be operated independently of one another.

A connection which has been established owing to the fact that the communications device itself allows or accepts a connection can be referred to as an "extrinsic connection" of the field device apparatus or as a "remote connection" of the field device apparatus. The intrinsic connection may be established, unlike an extrinsic connection, by actively establishing the connection.

In the case of an intrinsic connection the communications device can have the role or function of a client. In the case of an extrinsic connection the communications device can have the role or function of a server. The selective connection may be achieved by switching an operating mode and in particular by switching the role that the communications device has within the respective connection, i.e. whether it initiates a connection or reacts to a request for connection. The transmission technology used for the respective connection is the same transmission technology for the intrinsic connection and for the extrinsic connection. The transmission technology may in one example refer to the hardware which is responsible for establishing the connection and the communication, in particular the protocols that are used, for example GSM, LTE, UMTS, IEEE 802.x. Furthermore, it is possible to always use the same port or the same interface which is just operated in different directions. It may therefore be sufficient to implement only one single communications standard or one single communications protocol in the communications device. The intrinsic connection may also just be an access connection to a communications network which, however, uses another technology in the backbone. In the communications device itself, however, there may be no protocol conversion. The communications device may be homogenous in relation to the protocols.

In the case of a wired connection the switching of a role or function can also include switching a physical property or interface. For example, the role can be switched in that communication is established as source or sink. In one example the communications device is configured to provide the measurement value and/or to receive a command.

The evaluation device may be understood not only as a signal processing device for determining or converting measurement values, but can also be for example an operating device by means of which instructions or commands can be provided to the field device apparatus. The evaluation device can however also be defined as a display device or display instrument which can show a determined measurement value. An evaluation device may therefore be configured for evaluating a measurement result, for parameterising, i.e. for setting a parameter of the field device apparatus, for displaying the measurement result and/or for operating the field device apparatus. In particular, the measuring device can be influenced or controlled by the evaluation device. An evaluation device and an operating device can substantially differ in the direction of flow of information that is processed or provided by the respective device. When evaluating a measurement value the information can flow from the field device apparatus to the evaluation device. During operation the information may flow from the evaluation device to the field device apparatus. For example, the physical measurement value may be converted in the field device apparatus to a fill level. Often the field device apparatus comprises a signal processing device for the conversion, which receives raw data, i.e. the unprocessed physical measurement values and converts them to a fill level. It is however also possible for the physical raw data, raw data or raw measurement data to be sent to an evaluation device and converted there to a fill level. Then the field device apparatus can be operated without a signal processing device. In another embodiment it is also possible however for a fill level determined from the raw data to be sent to the evaluation device and for a volume to be calculated there from said fill level. For the volume calculation a corresponding signal processing device is provided in the evaluation device, which signal processing device determines another measurement value in a further processing step.

By providing selectively connecting via a communications network or via a direct connection it is possible to achieve a simple or flexible connection establishment to a field device apparatus or to a field device. In particular, it is possible to take into consideration that often a communications network is out of the range of the field device apparatus and/or the evaluation device, whereas the evaluation device and the field device apparatus are in the immediate vicinity thereof. In addition, failure of a communications network can be tolerated, since although the connection via the communications network fails there is still the selective alternative of forming a direct connection between the field device apparatus and evaluation device by establishing an extrinsic connection. The connection parameters are saved in the field device apparatus and may be used in both modes of operation.

To provide the direct connection and the indirect connection, in one example the same communication protocol can be used, for example a protocol from the IEEE 802.11 family. By selecting the communication protocol for the indirect connection thus the selection of the communication protocol of the direct connection may also be determined. In other words the communications device can have just a single protocol stack. The choice of whether a direct connection or an indirect connection is used may determine whether the communications device can initiate a connection request or terminate a communication request.

In order that a connection can be established to a field device apparatus or a field device via a wireless network or a wired network, access data may be saved in the field device apparatus. If a login to a communications network is performed the authentication data or the access data of the field device apparatus may be requested by the communications network. For the login to a communications network the first operating mode or the indirect operating mode may be set, selected or configured. In the indirect operating mode, in which the field device apparatus logs into the communications network, the communications network, in particular a network node of the communications network that knows the access data, takes the role or function of an authentication server. The field device apparatus takes the role or function of an authentication client. Thus, the client may establish an intrinsic connection.

The access data to the communications network may however be saved in the field device apparatus. By using said access data the field device apparatus can be authenticated in the communications network. In one example a key can be used as the access data. In addition to a key a network name may also be requested. In the example of a WLAN network or Wi-Fi network the network name is the so-called SSID (service set identification). The key is dependent on the respectively used authentication protocol. Examples of authentication protocols in the field of a wireless LAN (WLAN) are wired equivalent privacy (WEP), Wi-Fi protected access (WPA) or WPA2. Furthermore, a temporal key integrity protocol (TKIP) can be used. For the authentication of subscribers a pre-shared key (PSK) or extensible authentication protocol (EAP) can also be used. For access to a WLAN the IEEE standard 802.11 can be used in different embodiments as the underlying transmission protocol, for example as IEEE 802.11i. For authentication a radius server can also be used in the communications network. In other wireless access networks the wireless application protocol (WAP) can be used to enable a login to a mobile radio network, such as GPRS or UMTS.

According to a further aspect of the present invention it may be provided to use the access data for the communications network, saved in the field device apparatus, for example the access key and the SSID, in order to provide access on its own for other devices. To save the access data, for example a designated register, a RAM, a ROM, a SIM card or an EPROM can be provided in the field device apparatus as a storage device. In other words the field device apparatus can be used selectively as a client or server in a communication relationship. When the field device apparatus logs onto a communications network in order to communicate with an evaluation device, operating device or display device, the field device apparatus makes the access data available upon an inquiry or upon a request of the communications network. However, if the field device apparatus itself provides an access network for other devices, such as an evaluation device, display device or operating device, then the field device apparatus sends the request for access data to the device to be logged on so that the latter authenticates itself. The access data saved in the field device apparatus are then used to authenticate the device which wants to connect directly to the field device apparatus. The authentication data provided by this device are verified in the field device apparatus. For direct connection the field device apparatus may reproduce or simulate the communications network.

The request for access data generally runs in reverse direction, compared to the request for establishing a connection, i.e. in reverse to the connection request.

An evaluation device may comprise a display device for representing a measurement value and also an operating device for parameterising the field device apparatus. In order to ensure an exchange of information between the field device apparatus and evaluation device an additional communications connection may be established. For example access to the communications network and/or the direct connection of the field device apparatus to the evaluation device may be on a lower layer of the OSI (open systems interconnection) layer model. In one example the indirect connection and the direct connection can be a point-to-point connection or a layer 2 connection. Determined measurement values, data for parameterising (parameters to be set), query instructions, commands to the field device or from the field device can be dealt with on a higher layer, for example layer 3. For communication on a higher layer connectionless or connection-oriented protocols can be used. Tunnel connections can also be used between the field device apparatus and the evaluation device. A subscriber end device, such as a PC, a computer, a mobile device, such as a notebook, smartphone or tablet PC, with an appropriate loaded application or software can be used as the evaluation device. The application may be used for establishing the connection and for communication.

In one example the method for communicating comprises the function of selecting the status or operating mode which determines whether the communications device can be connected via a communications network to an evaluation device or whether the communications device can be connected directly to the evaluation device. In other words the method may comprise selecting a mode of connection, an operating mode or a connection status which decides whether the communications device can be connected via a communications network to an evaluation device or whether the communications device can be connected directly to the evaluation device. By sending a connection request the communications device may be connectable with a communications network. By waiting for a connection request the communications device may be directly connectable.

In other words this may mean that the method provides selecting whether the communications device allows a connection to a communications network and/or whether the communications device allows a direct connection to an evaluation device substantially without the use of a communications network.

The term "direct connection" may mean that substantially no network infrastructure is used between the field device apparatus and the evaluation device. In other words a direct connection may in fact be a point-to-point connection with a metric of 1. This may mean that either a direct link or a direct radio connection is established between the evaluation device and the communications device. Furthermore, it may mean that in fact the signals generated by the evaluation device or the communications device are terminated according to the communication direction on the communications device respectively on the evaluation device. Furthermore, in the case of a direct connection, between the communications device and the evaluation device there may be substantially no interim storage of the transmitted data in a buffer or register memory and in addition there may be substantially no protocol conversion. In the case of an indirect connection via a communications network there may be a protocol conversion between the communication end points.

According to another aspect of the present invention the communications device may provide a communications access network for direct connection to the evaluation device. The same hardware is used as for connecting to a communications network. In other words, a communications device may physically create the possibility of connecting to another device. However, whether an access network is provided or not depends on whether the communications device is adapted to verify access data. Whether a login to an access network is enabled or not depends on whether the communications device is configured to provide access data.

The provision of a communications access network by the field device apparatus, in particular by the communications device, may be achieved by selecting the role of the field device apparatus in a communication relationship.

The term "communications access network" can be used to mean that the communications device is adapted to enable the authentication of evaluation devices. In general, a communications device may enable any point-to-point connection. Said point-to-point connection can be wireless, i.e. radio-based, or wired, i.e. by means of a directly connected electric cable. In such a point-to-point connection received data may only be passed to a predefined point or location. In order to control the flow of data and in particular in order to control the direction of the dataflow, the access to the communications device is secured by means of authentication mechanisms. In this way it may also be ensured that substantially no unauthorised subscriber can use such a point-to-point connection. Thus, by using authentication mechanisms it may be provided that only authorised evaluation devices can make contact with the field device apparatus, even though communication would be possible via the purely physical connection plane. The communications device may therefore discard data provided by non-authenticated subscribers.

In order to provide an access network an authentication device is provided in the field device apparatus, wherein the authentication device is adapted to check the authorisation of an evaluation device for the desired action before the communication data are processed further and to ensure the forwarding of data only after successfully confirming the authorisation.

According to a further aspect of the present invention the communications device is configured to use access data, which the communications device uses for logging onto the communications network, for direct connection to the evaluation device.

In order to log onto a communications network the access data may be saved for example in a register in the communications device of the field device apparatus. For the login process to the communications network, the communications device may react to a request which is initiated by the communications network. Afterwards the communications device may provide the authentication data or access data. The access data can for example comprise a username, a password or an SSID on its own or in any combination.

The role of the communications device and thereby the role of the field device apparatus can change from a client to a server and vice versa. If the role, the status or the operating mode of the field device apparatus changes from a client to a server, the field device apparatus is no longer the subscriber or client of the communications network, but provides the communications network itself and in particular the communications access network to which other devices can log on. In said direct operating mode the field device apparatus may demand authentication data from an evaluation device, which requests direct access to the field device apparatus. In order to request the authentication data, the field device apparatus may take on the role of the authentication server and direct a request for providing authentication data to the evaluation device which wants to connect to the field device apparatus in a direct manner. Consequently, when selecting the direct connection, the performed login process can change by comparison with the login to the communications network from the point of view of the communications device, and in particular the login process can be reversed.

If the field device apparatus logs onto the communications network, the field device apparatus reacts to a request from the communications network or the communications access network to provide the authentication data. Said authentication data or access data are the same data that the field device apparatus requests from the evaluation device in the case where the field device apparatus provides a direct connection.

In summary the communications device of the field device apparatus can be used optionally or selectively as an authentication client or as an authentication server. For the different use, in one example a program code can be selectively loaded which ensures the function as a client in order to log on to a communication access network itself. However, the program code of an authentication server may be loaded if the field device apparatus provides the communications access network or the direct connection for other devices.

According to yet another aspect of the present invention the communications network and/or the communications access network is a radio network or wireless network.

For example, the communications device for providing a direct connection can have the function of an access point, in particular of a wireless access point. The radio technology may enable rapid switching between communications networks, to which an evaluation device can log on, so that a login can be performed either directly or indirectly. For example, if a radio communications network fails it is possible to transfer to a radio network provided by the field device apparatus without changing the wiring. To switch or to transfer the network, the authentication process may substantially be merely reversed, whereby a switch is made between the role as client and server, for example also when the field device apparatus and/or the evaluation device move out of range of the communications network and then establish a direct connection to one another.

According to a further aspect of the present invention the field device apparatus can comprise a switching device, which is adapted to switch the communications device between at least the first operating mode and the second operating mode.

In the first operating mode the communications device may be indirectly connectable via the communications network to the evaluation device. In the second operating mode the communications device may be directly connectable to the evaluation device. In the first operating mode the communications device may thus be reachable via the communications network. In the second operating mode the communications device may be reachable substantially only by direct access. In order to distinguish between these states in the first operating mode the communications device may be adapted such that it can react to an authentication request from the communications network and provides the access data but does not generate a request itself. In the second operating mode the communications device may be configured such that it provides an authentication request to an evaluation device and verifies received access data.

However, it is also possible to run a plurality of evaluation devices on the field device apparatus, wherein one evaluation device may be connectable via a direct connection while another evaluation device may be connectable via a communications network. The communications device may substantially comprise a plurality of entities which are operated respectively in either the first or second operating mode. Thus it may be possible to simultaneously provide direct connections to a group of evaluation devices and indirect connections to another group of evaluation devices. In one example only one single communications device can be used which comprises a group of interfaces that are configured for direct connections and/or which comprises another group of interfaces which are configured for indirect connections. In one example the communications device comprises a plurality of interfaces each with their own access data.

According to another aspect of the present invention the field device apparatus comprises a status recognition device. A status recognition device may be configured to recognise the current status or use status of the field device apparatus at a specific time. Said use status may be recognised independently of the first operating mode and the second operating mode. However, depending on the recognised use status or state of use the status recognition device may select whether the communications device is connectable to the evaluation device in an indirect or in a direct manner.

In other words by means of the status recognition device the first operating mode or the second operating mode of the communications device or of any entity of the communications device can be selected. The status recognition device may be adapted to recognise the current use status of the field device apparatus and to select, according to the identified use status, whether the communications device can be connected to the evaluation device via the communications network or can be connected directly.

The status recognition device may also take into account a time indicating how long a specific use status lasts. For example the status recognition device may recognise that a communications network has failed or is out of range and thereby determine how long this use status of being out of range of the communications network will last before it selects a new operating mode for the communications device. Thus for example in the case of a brief network failure or a restart or reboot it may be possible to prevent switching straight away from the first operating mode into the second operating mode. This waiting time may generate a hysteresis to prevent switching back and forth rapidly between different types of connection.

In addition, the status recognition device may be adapted to determine how many and also which evaluation devices operate an active communications connection to the field device, for example on a higher layer of the OSI model. After a network failure it thus may be possible for example to prevent new devices from logging onto the field device apparatus which were not connected prior to the failure in order to prevent the overloading of the then self-sufficiently operated field device apparatus. For example, as a criterion for recognising the evaluation devices which are still allowed to connect, a MAC (media access control) address can be checked as a piece of access data. Other selection criteria, according to which the number of permitted evaluation devices are evaluated, can be recorded in a corresponding list. Any combination of individual access data may be possible, which data are checked for the indirect and/or direct access.

The first operating mode can be a client operating mode, whereas the second operating mode is a server operating mode and/or an access point operating mode.

According to still another aspect of the present invention the status recognition device may be adapted to recognise the status, use status or state of use of the field device apparatus by means of a characteristic, the characteristic being selected from a group of characteristics. Said group of characteristics consists of a signal strength, a communications network availability signal, geoinformation, geological information, geoinformatic data, a time point or time period, and a registration entry. For example specific weekdays and/or specific time intervals can be selected as the time period.

It is possible for example to establish from the signal strength that the field device apparatus has moved out of range of a communications network and thus has to provide access or access infrastructure itself in order to maintain communication with an evaluation device. A communications network availability signal can be for example a pilot signal or availability identification which are exchanged at regular intervals or permanently between a communications network and the communications device, in order to indicate that the network connection is still in effect or that a valid network connection still exists. Said availability identification can also be transmitted in a separate channel. The geoinformatic data may provide information about the site of the field device apparatus where the field device apparatus is located. Thus for example a location-dependent switching can take place between the different types of connection or modes of operation. As a result the switching between the role as client and server can take place in accordance with the location. In another example a register entry can be set by an operating device, a graphical user interface or a web browser, whereby the operating mode is defined as a client or server.

In addition, the availability of the modes of operation can be defined in terms of time so that for example a direct connection can only be made available at specific predefinable times. Thus for example it can be determined that a direct connection is only possible on workdays between 8:00-18:00.

According to another aspect of the present invention the communications device is adapted to establish a bidirectional communications channel with the evaluation instrument or the evaluation device for providing the measurement value and/or for receiving the command.

Said communications channel may be a communications channel on a higher layer than the access connection. Via said channel there can be an exchange of information between the evaluation device and the field device apparatus. Said exchange of information can comprise for example a query command or a query instruction, by means of which a determined measurement value can be queried. It can comprise a parameter which is to be set in the field device apparatus. However, push information can also be provided by means of which a determined measurement value can be provided via said communications channel. The communications channel may be independent of an access connection to the communications network.

It should be noted that different aspects of the invention have been described in relation to different subject matter. In particular, some aspects have been described with reference to device claims, whereas other aspects have been described with reference to method claims. However, a person skilled in the art can take from the above description and the following description that, unless otherwise mentioned, in addition to each combination of features belonging to a category of subject matter, any combination of features can be considered to be disclosed by the present text, which relates to different categories of subject matter. In particular, combinations of features of the device claims and features of method claims are disclosed.

BRIEF DESCRIPTION OF THE FIGURES

In the following further exemplary embodiments of the present invention are described with reference to the figures.

DETAILED DESCRIPTION OF EMBODIMENTS

The representations in the figures are illustrative and not to scale. In the following description of FIG. 1 to FIG. 4 the same reference numerals are used for the same or corresponding elements.

Figure 1:
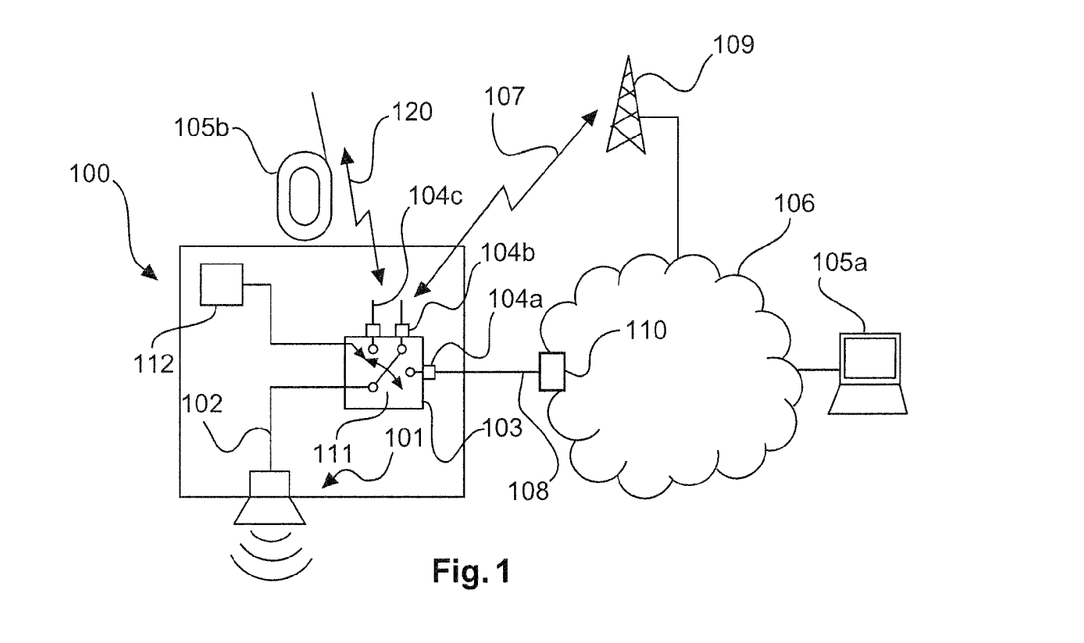
FIG. 1 shows a field device apparatus with different connections to evaluation devices according to an exemplary embodiment of the present invention.

FIG. 1 shows a field device apparatus comprising various connections to evaluation devices according to an exemplary embodiment of the present invention. The field device apparatus 100 or the field device 100 comprises a measuring device 101. Said measuring device 101 or the measuring sensor 101 can determine measurement values, for example fill levels, limit levels, temperatures or pressures, using different physical measuring principles. Examples of measuring principles are a guided microwave or a guided radar wave, a freely propagating electromagnetic wave, a freely propagating radar wave, a freely propagating sound wave, a temperature measurement or a pressure measurement. The measuring device 101 is connected to the communications device 103 by means of the connecting line 102. Said connecting line 102 is used to pass on measurement values to the communications device 103 or to receive parameters from the communications device.

The communications device 103 comprises the three network interfaces 104a, 104b, 104c. By means of said network interfaces 104a, 104b, 104c the field device apparatus 100 can be connected to one of the evaluation devices 105a, 105b. The communications device 103 can allow a single connection to evaluation devices or a plurality of parallel connections. Said connections can be set up independently of one another as direct or indirect connections by setting a corresponding operating mode. In FIG. 1 the evaluation device 105b is connected via a direct connection to the communications device 103, whereas the evaluation device 105a is connected indirectly to the communications device via the communications network 106. In this case, for each of the interfaces 104a, 104b, 104c an individual user context is provided. In particular, each of the interfaces manages its own access data, which differ from interface to interface. If only one evaluation device can be connected, a single set of access data or a single item of access data is provided.

In the case of an indirect connection via the communications network 106 a wireless access connection 107 or a wired access connection 108 can be used. The wireless link 107 and the wired link 108 extend respectively only from the communications device 103 to the communications network 106. The communications network 106 provides corresponding network access points 109, 110 which terminate the links 107, 108 on a lower layer.

By means of a selection device 111 or switching device 111 an operating mode of the communications device 103 can be selected. It is possible to switch between the direct connection mode via the interface 104c and the indirect connection mode via a communications network 106 and via the interfaces 104b or 104a. The interfaces 104c, 104b are represented as wireless interfaces, whereas the interface 104a is represented as a network-connected interface or landline interface. When using a wired access the process of switching between a direct and indirect operating mode can also include replugging the access connection 108.

In a further embodiment of the present invention the network interface 104b, by means of which a connection is established to a communications network 106, can also be used, by switching the operating mode, to establish the direct connection to the evaluation device 105b. Likewise the direct connection 120 can also be switched into an indirect connection. Thus the connection via link 120 and link 107 can also be taken as the representation of an interface 104 at different time points 104a, 104b. When switching the same interface between different modes of operation the selection switch 111 is not a mechanical switch, as shown in FIG. 1, but a logical switch, which for example switches an operating mode by loading different program codes. In another example the switch can provide for loading a different user context for the respective operating mode. The user context may comprise access data for a specific evaluation device. For example, it is possible to switch from a client operating mode for access to the communications network 106 to a server operating mode, to enable the access of the evaluation device 105b to the communications device 103.

Switching the operating mode can be performed substantially by switching the direction in which the authentication is performed. In the indirect operating mode, which involves a connection of the evaluation device 105a via the communications network 106 connected therebetween, the communications device 103 can provide authentication features or access data saved therein to the network 106. However, in the direct connection mode the communications device 103 requests authentication data from the evaluation device 105b in reverse direction. The wireless connection is then performed in both cases via the wireless interface 104c or 104b. The access data can be a network identifier SSID and a password.

Even though different evaluation instruments 105a, 105b are shown in FIG. 1, in general said evaluation instruments can be one and the same evaluation instrument. For example the evaluation device 105a can comprise both a wired network interface and a wireless network interface or the wireless evaluation device 105b can connect directly via the wireless interface 104c, 104b of the communications device 103 and also via the wireless access point 109 of the communications network 106.

The switching device 111, the switch 111 or the operating mode selection device 111 is controlled by the status recognition device 112. The status recognition device 112 can recognise the present status for example by means of a signal strength, a communications network-availability signal, geoinformatic data, a time point or time period, or a register entry in the field device apparatus 100 and set the associated operating mode.

Figure 2:
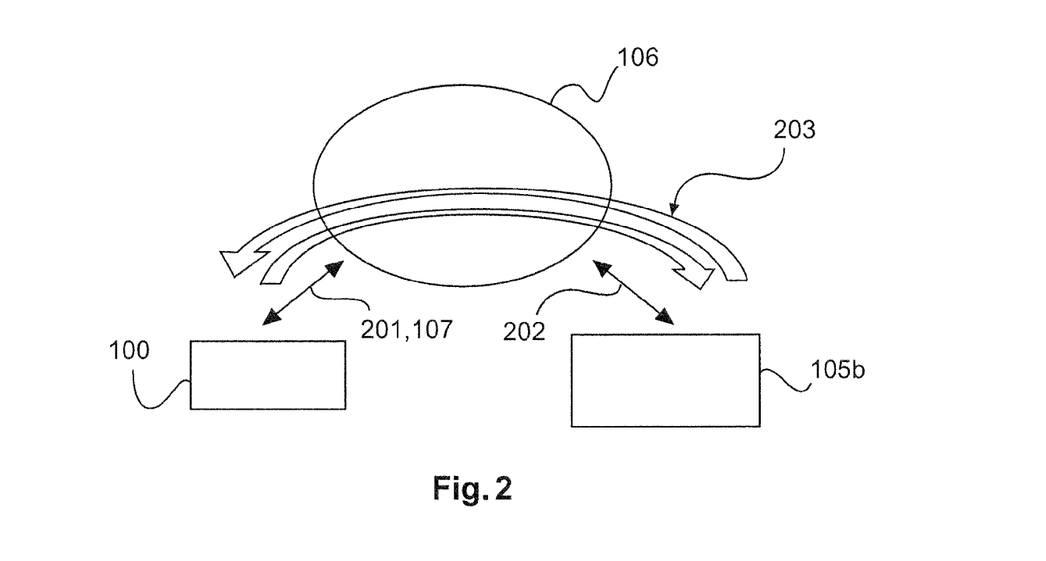
FIG. 2 shows an indirect connection between a field device apparatus and an evaluation device via a communications network according to an exemplary embodiment of the present invention.

FIG. 2 shows an indirect connection between a field device apparatus and an evaluation device via a communications network according to an exemplary embodiment of the present invention. The field device apparatus 100 is connected to the communications network 106 via a link 201, which can be wireless 107 or wired 108. Likewise the wireless evaluation device 105b is connected via a wireless link 202 or (not shown in FIG. 2) the wired evaluation device 105a is connected to the communications network 106 via a wired link 202. To establish the connections 201, 202, in particular the access connections 201, 202, the field device apparatus 100 and the evaluation device 105b use the same login data or the same access data.

The communications network 106 can be a wireless network, for example a WLAN, GSM, UMTS or LTE, wherein the definition as a wireless network derives substantially from the access technology used for the network 106. The field device apparatus 100 and the evaluation device 105b are connected indirectly via the communications network 106, as the communications network 106 is arranged between them. Access to the communications network 106 is performed on a lower layer of the OSI reference model.

The bidirectional communication connection 203 is adapted for the exchange of information, for example for exchanging measurement values or data for adjusting parameters (parameterising data) or for setting parameters, which communication connection lies on a higher layer than the access connections 201, 202, whereby the access connection and the communication connection are independent of one another. In order that a connection can be established via the access connection 201 and 202 of the evaluation device 105b to the field device apparatus 100 via the communications network 106, the field device apparatus 100 is integrated in the existing infrastructure, which is formed by the wireless communications network 106. For this indirect integration the field device apparatus 100 need not provide any accessibility. The connection between the evaluation device 105b, 105a and field device apparatus 100 is performed on a higher layer via corresponding communication connections 203.

In the case of mobile field device apparatuses 100 it may be that said apparatuses are to be used within an existing infrastructure 106 and as well that the mobile field device apparatuses 100 are to be used self-sufficiently. FIG. 1 shows, by means of the interfaces 104a, 104b, the operation of a field device apparatus 100 in the existing infrastructure 106.

The access data of said infrastructure 106 that are saved in the field device apparatus 100 are used so that the field device apparatus 100 logs onto the infrastructure 106 as a permissible network subscriber or client. The access data can be a single item of access data and/or a set of access data, i.e. at least two parameters for a successful login. After the login and registration the field device apparatus 100 is visible to all other network participants of said infrastructure 106, for example to the evaluation device 105b. This can mean in other words that on the basis of a connection on a lower layer of the OSI protocol a connection 203 can be made on a higher protocol layer between a network subscriber 105b or an evaluation device 105b and a field device apparatus 100. The authentication, i.e. the registration or login, to the communications network 106 can be performed via different access protocols and associated access data, such as for example WEP, WPA, keys or passwords or even data carriers, such as a SIM card (subscriber identity module) or authentication information saved in the field device apparatus 100 itself.

The connection between an evaluation device 105b and a field device 100 can be for example an IP (internet protocol)-based connection which is substantially on the OSI protocol layer 3. Without restricting the universality, an evaluation device 105b can also be a display device or operating device, by means of which information can be received from the field device apparatus 100 or instructions or information can be sent to the field device apparatus 100.

Figure 3:
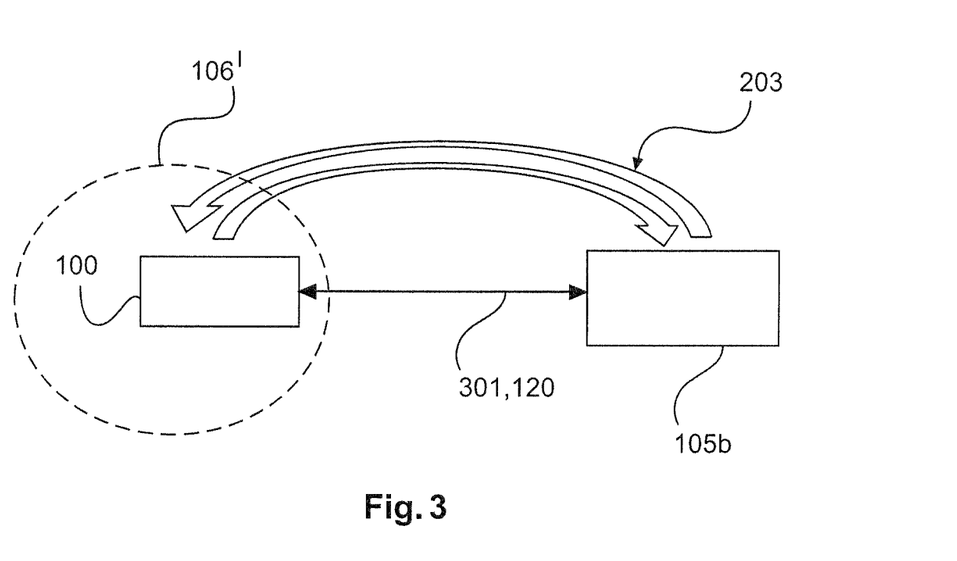
FIG. 3 shows a direct connection between a field device apparatus and an evaluation device according to an exemplary embodiment of the present invention.

FIG. 3 shows a direct connection between a field device apparatus and an evaluation device according to an exemplary embodiment of the present invention. A substantially direct connection 301, 120 is established between the field device apparatus 100, which can be a mobile field device apparatus, and the evaluation device 105b. Said direct connection 301, 120 is wireless in the example of FIG. 3 and is performed via a radio protocol. The direct connection 301, 120 can however also be established by wire connection and by replugging.

To establish the direct connection 301, 120 the access data or authentication data, which are saved in the field device 100 or the field device apparatus 100 and by means of which the field device apparatus 100 can also log on to the communications network 106, are used to provide an access point for other network subscribers 105b. Another network subscriber could be the evaluation device 105b for example which uses the field device apparatus 100 as an access point or point of access. The same login information as for access to the network 106 is used for authenticating the evaluation device 105b in the field device apparatus 100. However, when the access network 106' is made available, in contrast to logging onto a communications network 106 or registering in a communications network, the field device apparatus 100 is operated in a server mode or in access point mode.

This means that to establish the connection 301, 120, after receiving a connection request in the field device apparatus 100, the field device apparatus 100 sends an authentication request to the evaluation device 105b in order to request the authentication data. After successful authentication the direct connection 301, 120 is made possible.

To enable the direct connection the field device apparatus 100 simulates a communications network 106', so that the evaluation device 105b generally assumes it is logging onto a communications network 106.

FIG. 2 thus shows an indirect operating mode of the field device apparatus 100, in which a connection of the field device apparatus 100 to the evaluation device 105b is made possible substantially only via the communications network 106. However, FIG. 3 shows a direct operating mode in which the evaluation device 105b logs on directly to the field device apparatus 100, in particular to the simulated network 106'. The field device apparatus 100 is thus adapted for mobile use in that it can be switched between both modes of operation. The system that comprises the evaluation device 105b and the mobile field device apparatus 100 can thus be operated self-sufficiently.

When using a mobile field device apparatus 100 it may be that the field device apparatus 100 is used both within an available infrastructure 106 and also self-sufficiently. Thus the establishing of a connection between an evaluation device 105b and a field device apparatus 100 can be configured to be flexible. Different use scenarios can also be taken into consideration. In the field device apparatus 100 itself it is possible to distinguish, for example by setting an operating mode, whether the field device apparatus 100 integrates or can be integrated in an existing network infrastructure 106, or whether it provides the required infrastructure 106' itself in order to integrate an evaluation device 105b directly. In both cases the same access data are used.

By making it possible to switch between a direct and indirect connection mode, i.e. by providing a suitable switching device 111, the establishment of a connection from a mobile device 105b, such as for example a notebook, smartphone or tablet PC, to a field device apparatus 100 can be simplified. The same access data are saved in the field device apparatus 100 independently of the operating mode. They can be used both for logging onto an infrastructure 106 and also for allowing the connection of an evaluation apparatus 105a, 105b.

By means of the status recognition device 112 for example it is possible to determine that the mobile field device apparatus 100 is to be operated outside the range of the network infrastructure 106 or that for example the network infrastructure 106 has failed because of a defect. In such a case without a network infrastructure 106, to connect the evaluation device 105b and field device apparatus 100, the same access data can be used to establish the communication connection 203 at a higher layer. The switching device 111 ensures the setting of the corresponding operating mode.

By switching flexibly between a client operating mode, as shown in FIG. 2, or a server operating mode, as shown in FIG. 3, a field device apparatus 100 can be operated flexibly and its application can be extended.

Figure 4:
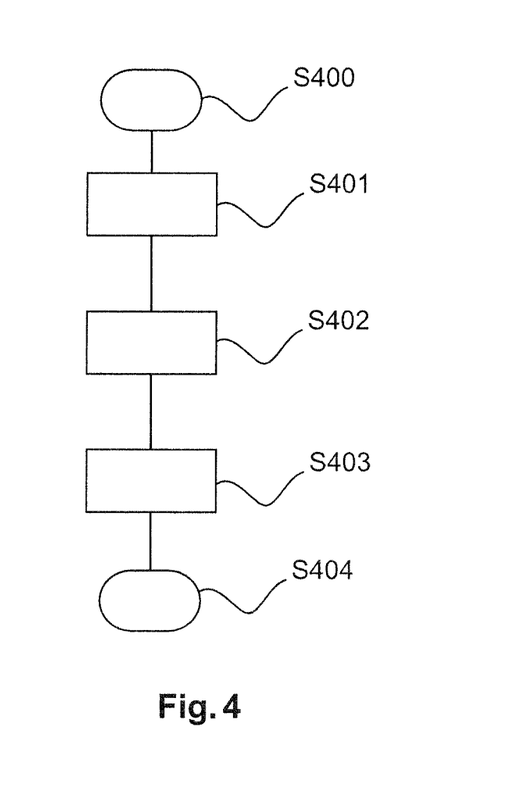
FIG. 4 sows a flowchart for a method for allowing a field device apparatus to communicate with an evaluation device according to an exemplary embodiment of the present invention.

FIG. 4 is a flowchart of a method for allowing a field device apparatus 100 to communicate with an evaluation device 105b. In an idle mode S400, in step S401 a measurement value is determined by a measuring device. In step S402 the measuring device is put in communication with a communications device in the field device apparatus 100. The measurement value is determined independently of the communication process. In step S403 a selection is made as to whether the communications device 103 is connectable to the evaluation device 105a, 105b either indirectly via a communications network 106 or directly via the direct connection 301, 120. For that selection evaluations of the present use status of the status recognition device 112 can be used. The selection device 111 can be a mechanical switch or also a control using a loadable program code or changeable register entries.

The field device apparatus 100 can be a field device, a measuring device, a fill level measuring device, a pressure measuring device, a limit level measuring device, a pulse meter, a radar measuring device or a capacitive measuring device.

Thus a field device apparatus 100 is described which, for communicating with an evaluation device 105a, 105b, can be operated in a direct or an indirect operating mode, both of which use the same access data.

In addition, it should be noted that "including" and "comprising" do not exclude other elements or steps and "a" or "an" does not exclude the plural form. Furthermore, it should be noted that features or steps that have been described with reference to one of the above embodiments can also be used in combination with other features or steps of other embodiments described above. Reference numerals in the claims should not be considered to be restrictions.

The invention claimed is:

1. A field device apparatus comprising:
a measuring device;
a communications device;
wherein the measuring device is configured to determine a measurement value and to communicate with the communications device; and
wherein the communications device is configured to set an operating mode for connection to an evaluation device, which operating mode can be selected from a first operating mode and a second operating mode;
wherein the first operating mode enables an indirect connection to the evaluation device via a communications network;
wherein the second operating mode enables a direct connection to the evaluation device;
wherein the indirect and the direct connection involves the use of same transmission technology;
wherein the communications device is configured to selectively operate as an authentication client or an authentication server;
wherein when the communication device operates as the authentication client, the communications device is configured to request access data and utilize the access data for logging onto the communications network in the first operating mode;
wherein when the communications device operates as the authentication server, the communications device is configured to request the access data and utilize the access data for connecting directly to the evaluation device in the second operating mode; and
wherein the communications device is configured to accept a connection request in the second operating mode.

2. The field device apparatus according to claim 1, wherein the communications device is configured to provide a communications access network, in order to enable the direct connection of the communications device to the evaluation device.

3. The field device apparatus according to claim 1, wherein the communications network and/or the communications access network is a radio network.

4. The field device apparatus according to claim 1, further comprising:
   a switching device;
   wherein the switching device is configured to switch the communications device between the first operating mode and the second operating mode.

5. The field device apparatus according to claim 1, further comprising:
   a status recognition device;
   wherein the status recognition device is configured to recognise the current status of the field device apparatus and to select, depending on the status, whether the communications device is to be operated in the first operating mode or in the second operating mode.

6. The field device apparatus according to claim 5, wherein the status recognition device is configured to recognise the status by a characteristic selected from the group of parameters consisting of:
   a signal strength;
   a communications network availability signal;
   a time point;
   a time period;
   geoinformatic data; and
   a register entry.

7. The field device apparatus according to claim 1, wherein the communications device is configured to establish a bidirectional communication channel with the evaluation device to make the measurement value available and/or to receive a command.

8. A method for communicating of a field device apparatus with an evaluation device, the method comprising:
   determining a measurement value using a measuring device;
   communicating of the measuring device with a communications device;
   setting an operating mode of the communications device for connecting to an evaluation device, which operating mode can be selected from a first operating mode and a second operating mode;
   wherein the first operating mode enables an indirect connection via a communications network;
   wherein the second operating mode enables a direct connection;
   wherein the indirect and direct connection involve the use of the same transmission technology;
   wherein the communications device is configured to selectively operate as an authentication client or an authentication server;
   wherein when the communication device operates as the authentication client, the communications device is configured to request access data and utilize the access data for logging onto the communications network in the first operating mode;
   wherein when the communications device operates as the authentication server, the communications device is configured to request the access data and utilize the access data for connecting directly to the evaluation device in the second operating mode; and
   accepting a connection request in the second operating mode.

9. A non-transitory computer-readable storage medium on which a program code is saved, which when executed by a processor performs a method comprising:
   determining a measurement value using a measuring device;
   communicating of the measuring device with a communications device;
   setting an operating mode of the communications device for connecting to an evaluation device, which operating mode can be selected from a first operating mode and a second operating mode;
   wherein the first operating mode enables an indirect connection via a communications network;
   wherein the second operating mode enables a direct connection;
   wherein the indirect and direct connection involve the use of the same transmission technology;
   wherein the communications device is configured to selectively operate as an authentication client or an authentication server;
   wherein when the communication device operates as the authentication client, the communications device is configured to request access data and utilize the access data for logging onto the communications network in the first operating mode;
   wherein when the communications device operates as the authentication server, the communications device is configured to request the access data and utilize the access data for connecting directly to the evaluation device in the second operating mode; and
   accepting a connection request in the second operating mode.

* * * * *